United States Patent
Ramasamy et al.

(10) Patent No.: US 12,286,584 B2
(45) Date of Patent: Apr. 29, 2025

(54) HIGH-PERFORMANCE PRIMARY EMULSIFIER FOR INVERT-EMULSION OIL BASED MUD

(71) Applicant: SAUDI ARABIAN OIL COMPANY, Dhahran (SA)

(72) Inventors: Jothibasu Ramasamy, Dhahran (SA); Mujtaba M. Alsaihati, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/538,609

(22) Filed: Nov. 30, 2021

(65) Prior Publication Data
US 2023/0167350 A1    Jun. 1, 2023

(51) Int. Cl.
*C09K 8/36* (2006.01)
*C09K 8/34* (2006.01)

(52) U.S. Cl.
CPC . *C09K 8/36* (2013.01); *C09K 8/34* (2013.01)

(58) Field of Classification Search
CPC .................................. C09K 8/36; C09K 8/34
See application file for complete search history.

(56) References Cited

U.S. PATENT DOCUMENTS

| | | | |
|---|---|---|---|
| 3,347,789 A | 10/1967 | Dickson et al. | |
| 4,306,980 A * | 12/1981 | Brandt | C09K 8/36 507/118 |
| 4,354,949 A | 10/1982 | Eggers et al. | |
| 5,252,554 A | 10/1993 | Mueller et al. | |
| 8,097,564 B2 | 1/2012 | Bevinakatti et al. | |
| 2003/0130135 A1 | 7/2003 | Hou et al. | |
| 2007/0066493 A1 * | 3/2007 | Funkhouser | C09K 8/68 507/261 |
| 2008/0070805 A1 | 3/2008 | Munoz et al. | |
| 2011/0220359 A1 | 9/2011 | Soliman et al. | |

* cited by examiner

*Primary Examiner* — Alicia Bland
(74) *Attorney, Agent, or Firm* — Osha Bergman Watanabe & Burton LLP

(57) ABSTRACT

An invert oil-based mud (OBM) includes an oleaginous continuous phase, an aqueous internal phase, and an emulsifier that has two hydrophilic head groups and a hydrophobic tail group. A method of using an invert oil-based mud (OBM) in a wellbore is provided. The method includes introducing the invert OBM, which includes an oleaginous continuous phase, an aqueous internal phase, and an emulsifier with two hydrophilic head groups and a hydrophobic tail group into the wellbore. A method of preparing an invert oil-based mud (OBM) is also provided. The method includes mixing an emulsifier comprising two hydrophilic head groups and a hydrophobic tail group with an oleaginous phase and an aqueous phase.

11 Claims, 1 Drawing Sheet

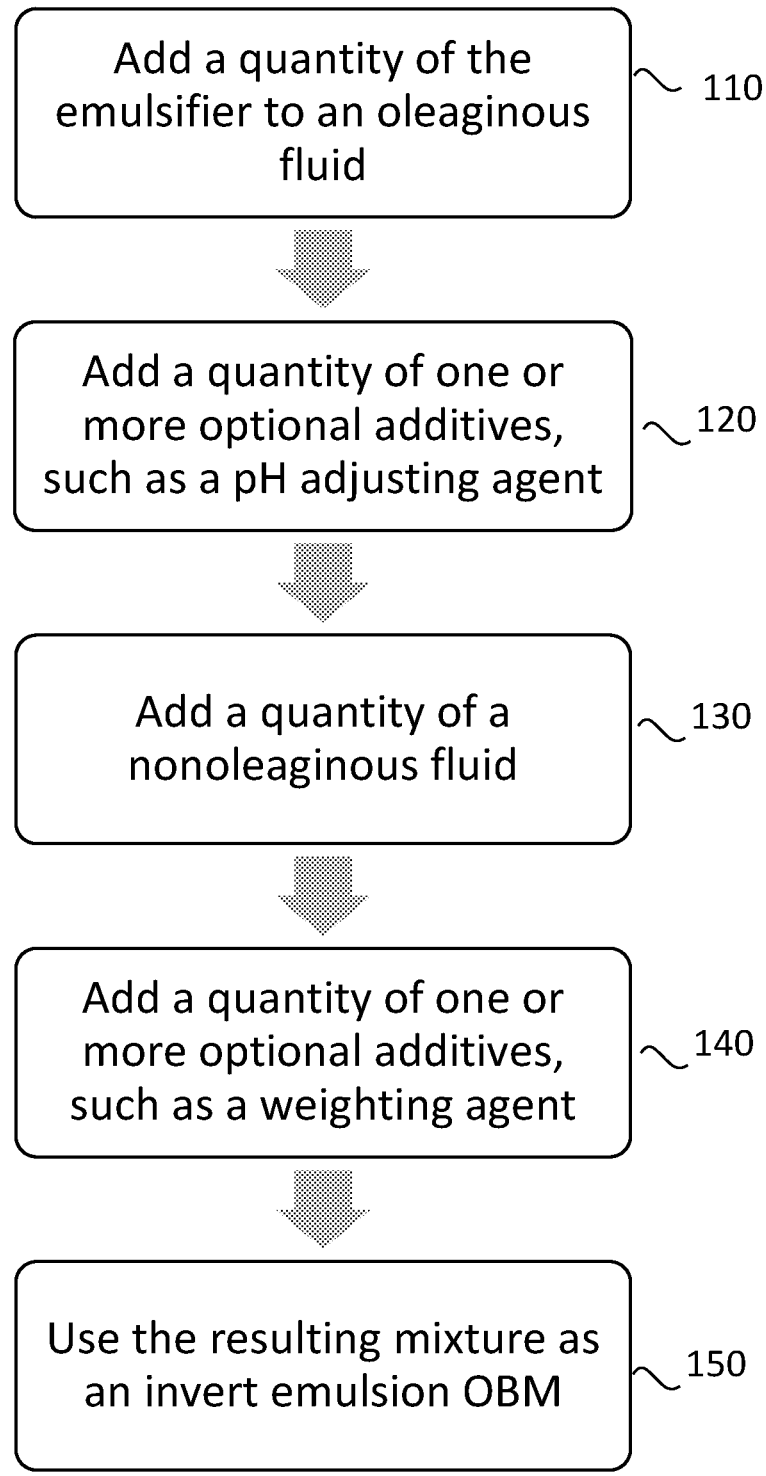

HIGH-PERFORMANCE PRIMARY EMULSIFIER FOR INVERT-EMULSION OIL BASED MUD

BACKGROUND

Wellbore drilling operations may use wellbore fluids for multiple purposes including, for example, cooling the drill bit and transporting wellbore cuttings to the surface. Drilling fluids are also used to reduce friction between the drill string and the casing or the wellbore wall by functioning as a lubricating medium. Drilling fluids can be divided into a variety of categories including, for example, oil-based drilling fluids and water-based drilling fluids. Additives may be included to enhance the properties of the fluids.

Although water-based muds (WBMs) are often preferred due to environmental concerns that are associated with oil-based muds (OBMs), they may not be viable for use in certain high pressure and high temperature (HPHT) sections of a wellbore. This leads to the employment of OBMs, including invert emulsion OBMs, which may be more stable under such conditions. OBMs can also provide improved shale inhibition over WBMs and so are also preferred when drilling wellbore sections that contain reactive shale. Invert emulsion OBMs may be formulated to include additives, such as emulsifiers, which aid in the formation of a stable water-in-oil (W/O) emulsion, and rheology modifiers, which allow for tuning the rheological properties of the fluid.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed herein relate to an invert oil-based mud (OBM) that includes an oleaginous continuous phase, an aqueous internal phase, and an emulsifier. The emulsifier comprises two hydrophilic head groups and a hydrophobic tail group.

In another aspect, embodiments disclosed herein relate to a method of using an invert oil-based mud (OBM) in a wellbore. The method includes introducing the invert OBM, which comprises an oleaginous continuous phase, an aqueous internal phase, and an emulsifier with two hydrophilic head groups and a hydrophobic tail group into the wellbore.

In yet another aspect, embodiments disclosed herein relate to a method of preparing an invert oil-based mud (OBM). The method includes mixing an emulsifier comprising two hydrophilic head groups and a hydrophobic tail group with an oleaginous phase and an aqueous phase.

Other aspects and advantages of the claimed subject matter will be apparent from the description, the drawings, and the claims that follow.

BRIEF DESCRIPTION OF DRAWINGS

FIG. 1 is a block flow diagram of a method in accordance with one or more embodiments.

DETAILED DESCRIPTION

Embodiments in accordance with the present disclosure generally relate to emulsifiers and their preparation, wellbore fluids that contain said emulsifiers, and methods of using said wellbore fluids. Generally, the emulsifiers of one or more embodiments disclosed comprise two hydrophilic head groups and a hydrophobic tail group.

As discussed above, invert emulsion OBMs may be used as drilling fluids for certain high pressure and high temperature (HPHT) sections of a wellbore due to their relative stability under such conditions. In order to provide this stability, the invert emulsion OBMs may include emulsifiers that aid the formation of a stable emulsion between oleaginous and non-oleaginous phases. Emulsifiers are a type of surfactant that generally have a hydrophilic head group and a hydrophobic tail (for example, a long carbon-containing chain). The combination of both hydrophilic and hydrophobic groups enables an emulsifier to reduce the interfacial tension between oleaginous and non-oleaginous phases and increase the emulsion stability of an invert emulsion OBM. This stabilization is generally provided by a "primary" emulsifier. Further "secondary" emulsifiers may be utilized to consolidate the stability of the dispersed phase or the overall emulsion stability.

Emulsifiers

Emulsifiers in accordance with one or more embodiments of the present disclosure may comprise two hydrophilic head groups and a hydrophobic tail group. The two hydrophilic head groups may comprise a carbon chain and two carboxylic acid functionalities. The carbon chain of the hydrophilic head group may vary in length from C3 to C5, meaning it may have 3 to 5 carbon atoms. In one or more embodiments, the two hydrophilic head groups have a carbon chain length of C4 (i.e., four carbon atoms), forming a succinic acid functionality as the hydrophilic portion of the emulsifier.

The emulsifier may have a hydrophobic tail group having a carbon chain ranging in length from C6 to C36 (i.e., the chain may have 6 to 36 carbons atoms). The hydrophilic tail may be saturated or unsaturated.

In one or more particular embodiments, the emulsifier may be 2-dodecenyl succinic acid having a structure as shown in Formula I.

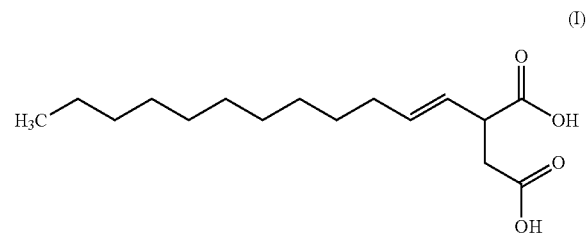 [SMILES: CCCCCCCCCC/C=C/C(CC(=O)O)C(=O)O]

(I)

Wellbore Fluids

One or more embodiments of the present disclosure relate to wellbore fluids and may include, for example, water-based wellbore fluids and oil-based wellbore fluids. In particular embodiments, the wellbore fluids may be oil-based emulsion fluids (otherwise known in the industry as a water-in-oil emulsion or W/O emulsion). The wellbore fluids may be drilling fluids, such as oil-based drilling muds (OBMs).

Oil-based wellbore fluids of one or more embodiments may have an oleaginous base fluid as the continuous phase. The oleaginous fluid may be a natural or synthetic oil. In one or more embodiments, the oleaginous fluid may be one or more of diesel oil, mineral oil, polyalphaolefins, siloxanes, organosiloxanes, fatty acid esters, and mixtures thereof. Safra oil is a highly de-aromatized aliphatic solvent in the class of kerosene.

Wellbore fluids of one or more embodiments may be emulsions that comprise both an oleaginous external phase and a non-oleaginous internal phase. The oleaginous external phase may comprise one or more of the oleaginous fluids described previously. The non-oleaginous internal phase may be an aqueous fluid. The aqueous fluid may include at least one of fresh water, synthetic or natural seawater, synthetic or natural brine, formation water, production water, brackish water, each of which may contain water-soluble organic compounds or minerals, or both, and mixtures thereof. The aqueous fluid may be fresh water that is formulated to contain various salts. The salts may include, but are not limited to, alkali metal halides and hydroxides. In one or more embodiments of the wellbore fluid disclosed, the brine may be any of seawater, aqueous solutions where the salt concentration is less than that of seawater, or aqueous solutions where the salt concentration is greater than that of seawater. Salts that may be found in seawater may include salts that produce disassociated ions of sodium, calcium, aluminium, magnesium, potassium, strontium, lithium, halides, carbonates, chlorates, bromates, nitrates, oxides, and phosphates, among others. In some embodiments, the brine may include one or more of the group consisting of an alkali metal halide, an alkali metal carboxylate salt, an alkaline earth metal halide, and an alkaline earth metal carboxylate salt. In particular embodiments, the brine may comprise calcium chloride. Any of the aforementioned salts may be included in brine.

In one or more embodiments, the density of aqueous fluid, and, in turn, the wellbore fluid, may be controlled by increasing the salt concentration. The maximum concentration is determined by the solubility of the salt.

In some embodiments, wellbore fluids may be invert emulsions that have an oleaginous external phase and a non-oleaginous internal phase. The invert emulsion of one or more embodiments may contain a volume ratio of the oleaginous phase to the non-oleaginous phase ranging from about 30:70 to about 99:1. For example, the invert emulsion may have a volume ratio of the oleaginous phase to the non-oleaginous phase ranging from a lower limit of any of 30:70, 40:60, 50:50, 60:40, 70:30, 80:20, and 90:10 to an upper limit of any 40:60, 50:50, 60:40, 70:30, 80:20, 90:10, and 99:1, where any lower limit can be used in combination with any mathematically-compatible upper limit.

In one or more embodiments, wellbore fluids may contain one or more of the emulsifiers described previously. The wellbore fluid of one or more embodiments may comprise the previously described emulsifier as a primary emulsifier in an amount ranging from about 0.1 to about 20 vol. %. For example, the wellbore fluid may contain the emulsifier in an amount ranging from a lower limit of any of 0.1, 0.3, 0.5, 0.7, 1.0, 1.2, 1.5, 2.0, 2.5, 3.0, 4.0, 5.0, and 10.0 vol. % to an upper limit of any of 1.0, 2.0, 3.0, 4.0, 5.0, 6.0, 7.0, 10.0, 12.5, 15.0, 17.5, and 20.0 vol. %, where any lower limit can be used in combination with any mathematically-compatible upper limit. In particular embodiments, the wellbore fluid may contain the emulsifier in an amount of about 1.0 to about 6.0 vol. %.

The wellbore fluid of one or more embodiments may comprise the previously described emulsifier as a primary emulsifier in an amount ranging from about 0.1 to about 10 wt. %. For example, the wellbore fluid may contain the emulsifier in an amount ranging from a lower limit of any of 0.1, 0.3, 0.5, 0.7, 1.0, 1.2, 1.5, 2.0, 2.5, 3.0, and 5.0 wt. % to an upper limit of any of 1.0, 1.5, 2.0, 2.5, 3.0, 3.5, 4.0, 5.0, 7.5, and 10 wt. %, where any lower limit can be used in combination with any mathematically-compatible upper limit. In particular embodiments, the wellbore fluid may contain the emulsifier in an amount of about 1.0 to about 3.0 wt. %.

In one or more embodiments, wellbore fluids may contain an additional, or secondary, emulsifier. The secondary emulsifier may be utilized to consolidate the stability of the dispersed phase or the overall emulsion. The secondary emulsifier of one or more embodiments is not particularly limited but, as would be understood by a person of ordinary skill in the art, is generally selected to be compatible with the primary emulsifier. In some embodiments, the secondary emulsifier may be EZ MUL® (Halliburton; Houston, TX).

The wellbore fluid of one or more embodiments may comprise a secondary emulsifier in an amount ranging from about 0.1 to about 10% by volume (vol. %). For example, the wellbore fluid may contain the secondary emulsifier in an amount ranging from a lower limit of any of 0.1, 0.3, 0.5, 0.7, 1.0, 1.2, 1.5, 2.0, 2.5, 3.0, and 5.0 vol. % to an upper limit of any of 1.0, 1.5, 2.0, 2.5, 3.0, 3.5, 4.0, 5.0, 7.5, and 10 vol. %, where any lower limit can be used in combination with any mathematically-compatible upper limit. In particular embodiments, the wellbore fluid may contain the secondary emulsifier in an amount of about 0.5 to about 2.0 vol. %.

The wellbore fluid of one or more embodiments may comprise a secondary emulsifier in an amount ranging from about 0.1 to about 5 wt. %. For example, the wellbore fluid may contain the secondary emulsifier in an amount ranging from a lower limit of any of 0.1, 0.2, 0.3, 0.4, 0.5, 0.6, 0.7, 0.8, 1.0, 1.2, 1.5, 2.0, 2.5, and 3.0 wt. % to an upper limit of any of 0.5, 0.6, 0.8, 1.0, 1.2, 1.4, 1.6, 1.8, 2.0, 2.5, 3.0, 3.5, 4.0, 4.5, and 5.0 wt. %, where any lower limit can be used in combination with any mathematically-compatible upper limit. In particular embodiments, the wellbore fluid may contain the secondary emulsifier in an amount of about 0.1 to about 1.0 wt. %.

Further, other additives may be included in the wellbore fluids of the present disclosure. Such additives may include, for instance, one or more of the group consisting of weighting agents, pH adjusting agents, rheology modifiers (or viscosifiers), wetting agents, corrosion inhibitors, oxygen scavengers, anti-oxidants, biocides, surfactants, dispersants, interfacial tension reducers, mutual solvents, thinning agents, and combinations thereof. The identities and use of the aforementioned additives are not particularly limited. One of ordinary skill in the art will, with the benefit of this disclosure, appreciate that the inclusion of a particular additive will depend upon the desired application and properties of a given wellbore fluid.

Weighting agents suitable for use in the wellbore fluids of one or more embodiments include, for example, bentonite, barite, dolomite, calcite, aragonite, iron carbonate, zinc carbonate, manganese tetroxide, zinc oxide, zirconium oxide, hematite, ilmenite, lead carbonate, and combinations thereof.

The pH adjusting agents that are included in the wellbore fluids of one or more embodiments may be one or more alkaline compounds. In one or more embodiments, suitable alkaline compounds include alkali metal and alkaline metal salts, such as lime, soda ash, sodium hydroxide, and potassium hydroxide, and combinations thereof.

The wellbore fluid of one or more embodiments may comprise a pH adjusting agent in an amount ranging from about 0.1 to 5 wt. %. For example, the wellbore fluid may contain the pH adjusting agent in an amount ranging from a lower limit of any of 0.1, 0.2, 0.3, 0.4, 0.5, 0.6, 0.7, 0.8, 1.0, 1.2, 1.5, 2.0, 2.5, and 3.0 wt. % to an upper limit of any of 0.5, 0.6, 0.8, 1.0, 1.2, 1.4, 1.6, 1.8, 2.0, 2.5, 3.0, 3.5, 4.0, 4.5, and 5.0 wt. %, where any lower limit can be used in combination with any mathematically-compatible upper limit. In particular embodiments, the wellbore fluid may contain the pH adjusting agent in an amount of about 0.5 to about 1.5 wt. %.

The viscosifiers that are included in the wellbore fluids of one or more embodiments may be selected from the group consisting of organophilic clays, hectorite clays, dimeric and trimeric fatty acids, polyamines, and sepiolite. In some embodiments, the viscosifier may be GELTONE® II (Halliburton; Houston, TX).

The wellbore fluid of one or more embodiments may comprise a viscosifier in an amount ranging from about 0.1 to about 5 wt. %. For example, the wellbore fluid may contain the viscosifier in an amount ranging from a lower limit of any of 0.1, 0.2, 0.3, 0.4, 0.5, 0.6, 0.7, 0.8, 1.0, 1.2, 1.5, 2.0, 2.5, and 3.0 wt. % to an upper limit of any of 0.5, 0.6, 0.8, 1.0, 1.2, 1.4, 1.6, 1.8, 2.0, 2.5, 3.0, 3.5, 4.0, 4.5, and 5.0 wt. %, where any lower limit can be used in combination with any mathematically-compatible upper limit. In particular embodiments, the wellbore fluid may contain the viscosifier in an amount of about 0.1 to about 1.0 wt. %.

The filtration control agents that are included in the wellbore fluids of one or more embodiments may be selected from the group consisting of modified lignites, asphalts or gilsonites, and nonaqueous polymeric fluids. In some embodiments, the filtration control agent may be DURATONE® HT (Halliburton; Houston, TX)

The wellbore fluid of one or more embodiments may comprise a filtration control agent in an amount ranging from about 0.1 to about 5 wt. %. For example, the wellbore fluid may contain the filtration control agent in an amount ranging from a lower limit of any of 0.1, 0.2, 0.3, 0.4, 0.5, 0.6, 0.7, 0.8, 1.0, 1.2, 1.5, 2.0, 2.5, and 3.0 wt. % to an upper limit of any of 0.5, 0.6, 0.8, 1.0, 1.2, 1.4, 1.6, 1.8, 2.0, 2.5, 3.0, 3.5, 4.0, 4.5, and 5.0 wt. %, where any lower limit can be used in combination with any mathematically-compatible upper limit. In particular embodiments, the wellbore fluid may contain the filtration control agent in an amount of about 0.5 to about 1.5 wt. %.

A method of preparing an invert OBM of one or more embodiments is depicted by FIG. 1. All components and quantities discussed in relation to said method correspond to those discussed previously. At 110, a quantity of the emulsifier is added to an oleaginous base fluid. At 120, a quantity of an optional additive, such as a pH adjusting agent, may also be added to the oleaginous base fluid. At 130, a quantity of a nonoleaginous fluid is added to the oleaginous fluid to which the previously mentioned components have been added. At 140, a quantity of an additive, such as a weighting agent, is added to the aforementioned components. At 150, the inverted oil-based drilling fluid mixed with the previously mentioned components is used in a wellbore drilling operation to drill a wellbore in a subterranean zone. For example, multiple barrels of the oil-based drilling fluid are prepared, each barrel mixed with the previously mentioned components. The multiple barrels are flowed through a subterranean zone while drilling a wellbore in the subterranean zone.

The physical properties of a wellbore fluid and the wellbore itself are important in determining the suitability of the fluid for a given application. Determination of which properties are needed for a given application depends on factors such as borehole size, mud weight, and formation type, among others.

The wellbore fluid of one or more embodiments may have a density ranging from 60 to 170 lbs/ft$^3$ (pounds per cubic foot). For example, the wellbore fluid may have a density with a lower limit of one of 60, 70, 80, 90, 100, and 110 lbs/ft$^3$ and an upper limit of one of 100, 110, 120, 130, 140, 150, 160, and 170 lbs/ft$^3$, where any lower limit may be paired with any mathematically compatible upper limit.

The wellbore fluid of one or more embodiments may have an electrical stability that is 100 V (volts) or more, 200 V or more, or 400 V or more. For example, the wellbore fluid may have an electrical stability that is of an amount ranging from a lower limit of any of 100, 150, 200, 250, 300, 350, 400, 450, and 500 V to an upper limit of any of, 550, 600, 650, 700, 750, 800, 850, 900, 950, and 1000 V, where any lower limit can be used in combination with any mathematically-compatible upper limit.

Rheological features, such as plastic viscosity (PV), yield point (YP), initial gel strength, and final gel strength, can be determined for a wellbore fluid. The values described may be determined for a wellbore fluid after hot-rolling at, for instance, 300° F. for 16 h (hours) under a pressure of 500 psi (pounds per square inch). The values were obtained from a viscometer at dial readings of 600 rpm (revolutions per minute) and 300 rpm. To measure the initial and final gel strength of a wellbore fluid, a viscometer can be operated at 600 rpm for 10 s (seconds) and then switched off for 10 s and 10 min (minutes), respectively. Afterward, the viscometer can be turned to a revolution speed of 3 rpm to provide the gel strength reading.

The YP and PV are parameters from the Bingham Plastic rheology (BP) model. The plastic viscosity of a fluid is a measure of the resistance of the fluid to flow. For instance, drilling fluids that have a reduced plastic viscosity, compared to drilling fluids with a greater PV value, have the capacity to drill more quickly. Plastic viscosity is dependent on both the solid content of a fluid and temperature. The wellbore fluid of one or more embodiments may have a plastic viscosity ranging from about 10 to about 40 cP (centipoise). For example, the wellbore fluid may have a plastic viscosity that ranges from a lower limit of any of 10, 12, 14, 16, 18, 20, 22, and 24 cP to an upper limit of any of 22, 24, 26, 28, 30, 32, 34, 36, 38, and 40 cP, where any lower limit can be used in combination with any mathematically-compatible upper limit.

The YP is determined by extrapolating the BP model to a shear rate of zero; it represents the stress required to move the fluid. The yield point is the resistance of a fluid to initiate movement and is an assessment of the strength of the attractive forces between the colloidal particles of the fluid. The yield point, for instance, demonstrates the capability of a drilling fluid to raise shale cuttings out of a wellbore under dynamic conditions. A fluid with a greater yield point may provide a better carrying capacity as compared to a fluid with similar density and reduced yield point. The wellbore fluid of one or more embodiments may have a yield point ranging from about 5 to about 50 lb/100 ft$^2$ (pounds per 100 square feet). For example, the wellbore fluid may have a yield point that ranges from a lower limit of any of 5, 8, 10, 12, 15, 17, 20, 22, and 25 lb/100 ft$^2$ to an upper limit of any of 28, 30, 32, 35, 37, 40, 42, 45, 48, and 50 lb/100 ft$^2$, where any lower limit can be used in combination with any mathematically-compatible upper limit.

The wellbore fluid of one or more embodiments may have an initial gel strength, after 10 seconds, ranging from about 3 to about 30 lbs/100 ft$^2$. For example, the wellbore fluid may have an initial gel strength that ranges from a lower limit of any of 3, 6, 9, 12, 15 and 18 lbs/100 ft$^2$ to an upper limit of any of 15, 18, 21, 24, 27, and 30 lbs/100 ft², where any lower limit can be used in combination with any mathematically-compatible upper limit.

The wellbore fluid of one or more embodiments may have a final gel strength, after 10 minutes, ranging from about 5 to about 40 lbs/100 ft². For example, the wellbore fluid may have a final gel strength that ranges from a lower limit of any of 5, 10, 15, 20, 25, and 30 lbs/100 ft² to an upper limit of any of 15, 20, 25, 30, 35, and 40 lbs/100 ft², where any lower limit can be used in combination with any mathematically-compatible upper limit.

The wellbore fluid of one or more embodiments may have a 3-rpm viscometer reading ranging from about 1 to about 20 cP. For example, the wellbore fluid may have a plastic viscosity that ranges from a lower limit of any of 1, 2, 3, 4, 5, 6, 7, 8, 9, and 10 cP to an upper limit of any of 11, 12, 13, 14, 15, 16, 17, 18, 19, and 20 cP, where any lower limit can be used in combination with any mathematically-compatible upper limit.

The wellbore fluid of one or more embodiments may have a 6-rpm viscometer reading ranging from about 2 to about 30 cP. For example, the wellbore fluid may have a plastic viscosity that ranges from a lower limit of any of 2, 4, 6, 8, 10, 12, 14, and 16 cP to an upper limit of any of 18, 20, 22, 24, 26, 28, and 30 cP, where any lower limit can be used in combination with any mathematically-compatible upper limit.

The apparent viscosity of a fluid is directly related to the swelling rate of the fluid in the presence of an inhibition medium. Therefore, a low apparent viscosity demonstrates that the fluid may have a reduced interaction with clay. The wellbore fluid of one or more embodiments may have an apparent viscosity ranging from about 10 to about 100 cP. For example, the wellbore fluid may have an apparent viscosity that ranges from a lower limit of any of 10, 15, 20, 25, 30, 35, 40, 45, and 50 cP to an upper limit of any of 55, 60, 65, 70, 75, 80, 85, 90, 95, and 100 cP, where any lower limit can be used in combination with any mathematically-compatible upper limit.

Methods

Wellbore fluids of one or more embodiments may be introduced into a wellbore or subterranean formation using techniques known to a person of ordinary skill in the art. The wellbore fluids of one or more embodiments may be used as one or more of a drilling or drill-in fluid during the drilling of a wellbore. The oil-based drilling fluid emulsified with the previously mentioned components may be used in a wellbore drilling operation to drill a wellbore in a subterranean zone. For example, multiple barrels of the oil-based drilling fluid may be prepared, each barrel mixed with the previously discussed components. The multiple barrels are introduced into a subterranean zone while drilling the wellbore in the subterranean zone.

EXAMPLES

The following examples are merely illustrative and should not be interpreted as limiting the scope of the present disclosure.

Materials:

Diesel used in the examples was obtained from TAQA (The Abu Dhabi National Energy Company) in Saudi Arabia. The 2-dodecenyl succinic acid (also referred to as "fatty mul") used in these examples was obtained from Alfa Aesar. A commercially available emulsifier used for comparative examples was VERSAMUL® (available from Slumberger). VERSACOAT® is an imidazoline functionalized fatty acid obtained from Slumberger. Geltone® is an organophilic clay available from Bariod. Lime used in the examples was obtained from Bariod. Duratone® is a sulphonated asphalt available from Bariod Barite used in these examples was obtained from National Factory.

In order to ascertain the ability of fatty mul to function as a primary emulsifier, invert OBMs having the compositions detailed in Table 1 were prepared. The oil:water ratio in the exemplary invert OBMs is 72:28. In Table 1, "cc" means cubic centimeters and "g" means grams.

TABLE 1

Compositions of exemplary drilling muds

| Mud System | Comparative Example 1 | Example 1 |
|---|---|---|
| Diesel(cc) | 218 | 218 |
| VERSAMUL ® (cc) | 6 | — |
| Fatty Mul (cc) | — | 6 |
| VersaCoat (cc) | 4 | 4 |
| Lime (g) | 6 | 3 |
| Geltone (g) | 4 | 2 |
| Duratone (g) | 6 | 6 |
| Brine (61 g CaCl$_2$ in 85 cc water) | 85 | 85 |
| Barite (g) | 161 | 161 |

Characterization:

The OBM dispersions were hot rolled at 300° F. for 16 h under a pressure of 500 psi. After hot rolling, the OBMs were cooled to room temperature and a OFITE Model 900 viscometer (OFI Testing Equipment, Inc.) was utilized for testing their rheology. The rheological properties of Example 1 and Comparative Example 1 were measured at 120° C. and are reported in Table 2. The properties of the Example 1 formulation were not obtained because the mud became too thick to measure the rheological properties. The properties AHR (after hot rolling) and BHR (before hot rolling) of Comparative Example 1 are reported.

The rheological features such as the plastic viscosity (PV) and yield point (YP) were estimated by using the values obtained from the dial readings of the viscometer at 600 rpm and 300 rpm. To measure the 10-second (initial) gel strength and the 10-minute (final) gel strength of the OBMs, the viscometer was operated at 600 rpm for 10 s and then stopped for 10 s and 10 min, respectively. Afterward, the viscometer was operated at a revolution speed of 3 rpm and the dial reading was noted as the 10-sec and 10-min gel strength, respectively, in pounds per 100 ft².

TABLE 2

Rheological properties of exemplary OBMs

| | Comparative Example 1 | |
|---|---|---|
| Property | BHR | AHR |
| 600 RPM Reading | 64 | 66 |
| 300 RPM Reading | 40 | 39 |
| 200 RPM Reading | 30 | 30 |
| 100 RPM Reading | 20 | 19 |
| 6 RPM Reading | 5 | 5 |
| 3 RPM Reading | 4 | 4 |
| 10 sec Gel | 5 | 4 |
| 10 min Gel | 6 | 6 |
| Electrical Stability | | 135 |
| HTHP Spurt Loss ml | | 8 |
| HTHP filtration ml | | 10 |
| HTHP Mudcake (mm) | | 3.97 |

TABLE 2-continued

Rheological properties of exemplary OBMs

| | Comparative Example 1 | |
|---|---|---|
| Property | BHR | AHR |
| PV | | 27 |
| YP | | 12 |
| LSYP | | 7 |

Additional samples were made to test a lower concentration of the fatty mul as the initial sample was too viscous to obtain property data. The compositions of the additional oil-based mud samples are shown in Table 3.

TABLE 3

Compositions of exemplary drilling muds

| Mud System | Comparative Example 2 | Example 2 | Example 3 |
|---|---|---|---|
| Diesel(cc) | 218 | 218 | 218 |
| VERSAMUL ® (cc) | 3 | — | — |
| Fatty Mul (cc) | — | 3 | 1 |
| VersaCoat (cc) | 4 | 4 | 4 |
| Lime (g) | 6 | 3 | 3 |
| Geltone (g) | 2 | 2 | 2 |
| Duratone (g) | 6 | 6 | 6 |
| Brine (61 g $CaCl_2$ in 85 cc water) | 85 | 85 | 85 |

The properties of the muds shown in Table 2 were tested as previously described and the results are shown in Table 4.

TABLE 4

Rheological properties of exemplary OBMs

| Property | Comparative Example 2 | Example 2 | Example 3 |
|---|---|---|---|
| 600 RPM Reading | 27 | 88 | 44 |
| 300 RPM Reading | 16 | 58 | 29 |
| 200 RPM Reading | 13 | 46 | 23 |
| 100 RPM Reading | 9 | 33 | 16 |
| 6 RPM Reading | 3 | 15 | 6 |
| 3 RPM Reading | 2 | 14 | 5 |
| 10 sec Gel | 4 | 22 | 8 |
| 10 min Gel | 4 | 60 | 12 |
| Electricity Stability | 70 | 140 | 74 |
| HTHP Spurt Loss ml | 6 | 6 | 7 |
| HTHP filtration ml | 10 | 10 | 12 |
| PV | 11 | 30 | 15 |
| YP | 5 | 28 | 14 |
| LSYP | 1 | 13 | 4 |

Results and Discussion

The plastic viscosity and yield point are important properties that inform the suitability of an OBM for a given application. Table 3 indicates that the plastic viscosity and the yield point of a drilling mud significantly increase with the use of the fatty mul emulsifier as compared to the INVERMUL® emulsifier. This increased yield point indicates that Examples 2 and 3 have an improved carrying capacity of cuttings as compared to Comparative Example 2. It is also important to note that Example 3 contains a third of the amount of primary emulsifier as compared to Comparative Example 2, yet exhibits similar, if not better, rheological properties.

The gel strength of a drilling mud reflects its ability to suspend a solid material under static conditions. It is a quantification of the attractive forces within the drilling mud system in the absence of flow. The gel strength of Examples 2 and 3 and Comparative Example 2 demonstrate that the use of the fatty mul prominently enhances the gel strength of an OBM after both 10 s and 10 min, as compared to a conventional emulsifier. Therefore, the addition of fatty mul provides an OBM having an enhanced solids-suspending capacity.

Finally, the electrical stability of Examples 2 and 3 and Comparative Example 1 demonstrate that the use of the fatty mul enhances the electrical stability of the invert OBM, as compared to a conventional emulsifier.

When either words "approximately" or "about" are used, this term may mean that there can be a variance in value of up to ±10%, of up to 5%, of up to 2%, of up to 1%, of up to 0.5%, of up to 0.1%, or up to 0.01%.

Although the preceding description has been described herein with reference to particular means, materials and embodiments, it is not intended to be limited to the particulars disclosed herein; rather, it extends to all functionally equivalent structures, methods and uses, such as those within the scope of the appended claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. An invert oil-based mud (OBM), comprising:
   an oleaginous continuous phase;
   an aqueous internal phase; and
   5.0 to 10 wt % of an emulsifier relative to the total weight of the OBM, wherein the emulsifier is 2-dodecenyl succinic acid.

2. The invert OBM according to claim 1, wherein the invert OBM has a plastic viscosity ranging from 10 to 40 cP (centipoise).

3. The invert OBM according to claim 1, wherein the invert OBM has a yield point ranging from 5 to 50 lbs/100 ft$^2$ (pounds per 100 square feet).

4. The invert OBM according to claim 1, wherein the invert OBM has an initial gel strength after 10 seconds ranging from 3 to 30 lbs/100 ft$^2$.

5. The invert OBM according to claim 1, wherein the invert OBM has a final gel strength after 10 minutes ranging from 5 to 40 lbs/100 ft$^2$.

6. A method of using an invert oil-based mud (OBM) in a wellbore, comprising:
   introducing the invert OBM into the wellbore, the invert OBM comprising an oleaginous continuous phase; an aqueous internal phase; and 5.0 to 10 wt % of an emulsifier relative to the total weight of the OBM, wherein the emulsifier is 2-dodecenyl succinic acid.

7. The method according to claim 6, wherein the invert OBM has a plastic viscosity ranging from 10 to 40 cP.

8. The method according to claim 6, wherein the invert OBM has a yield point ranging from 5 to 50 lbs/100 ft$^2$.

9. The method according to claim 6, wherein the invert OBM has an initial gel strength after 10 seconds ranging from 3 to 30 lbs/100 ft$^2$.

10. The method according to claim 6, wherein the invert OBM has a final gel strength after 10 minutes ranging from 5 to 40 lbs/100 ft$^2$.

11. A method of preparing an invert oil-based mud (OBM), comprising:
   mixing an emulsifier, with an oleaginous phase and an aqueous phase, wherein the emulsifier is mixed in an amount such that the invert OBM contains the emulsifier in an amount ranging from 5.0 to 10 wt. %, relative to the total weight of the OBM,
   wherein the emulsifier is 2-dodecenyl succinic acid.

* * * * *